(12) United States Patent
Binkin et al.

(10) Patent No.: US 12,120,272 B2
(45) Date of Patent: Oct. 15, 2024

(54) SYSTEM AND METHOD FOR HANDLING CALLS WITHIN GSM AND VOIP ENVIRONMENTS

(71) Applicant: MKNL TECHNOLOGY LTD., Ramat Gan (IL)

(72) Inventors: Daniel Binkin, Tel Aviv (IL); Alex Alexeev, Tel Aviv (IL); Michael Mirkin, Ramat Gan (IL)

(73) Assignee: MKNL TECHNOLOGY LTD., Ramat Gan (IL)

( * ) Notice: Subject to any disclaimer, the term of this patent is extended or adjusted under 35 U.S.C. 154(b) by 0 days.

(21) Appl. No.: 18/109,321

(22) Filed: Feb. 14, 2023

(65) Prior Publication Data

US 2024/0275885 A1    Aug. 15, 2024

(51) Int. Cl.
*H04M 3/527* (2006.01)
*H04L 65/1045* (2022.01)
*H04M 3/436* (2006.01)

(52) U.S. Cl.
CPC ........ *H04M 3/527* (2013.01); *H04L 65/1045* (2022.05); *H04M 3/436* (2013.01)

(58) Field of Classification Search
None
See application file for complete search history.

(56) References Cited

U.S. PATENT DOCUMENTS

| 9,826,096 | B1 * | 11/2017 | Slade | H01Q 25/001 |
| 11,196,860 | B1 | 12/2021 | Knuth et al. | |
| 11,888,929 | B1 * | 1/2024 | Wilfert | H04L 67/1014 |
| 2004/0064545 | A1 | 4/2004 | Miyake | |
| 2005/0041793 | A1 * | 2/2005 | Fulton | H04M 3/436 379/201.12 |
| 2006/0072726 | A1 * | 4/2006 | Klein | H04M 3/42263 379/211.01 |
| 2010/0262654 | A1 | 10/2010 | Yang | |
| 2011/0130168 | A1 * | 6/2011 | Vendrow | H04L 51/216 455/556.1 |
| 2011/0235552 | A1 | 9/2011 | Holder | |
| 2014/0274086 | A1 * | 9/2014 | Boerjesson | H04L 65/1104 455/450 |
| 2015/0201086 | A1 * | 7/2015 | Abi | H04M 1/2535 370/352 |

(Continued)

FOREIGN PATENT DOCUMENTS

WO   WO-2010002817 A2 *  1/2010   ........... H04M 15/00

*Primary Examiner* — Phyllis A Book
(74) *Attorney, Agent, or Firm* — SOROKER AGMON NORDMAN RIBA

(57) ABSTRACT

A method for handling an outgoing call within a telecommunications network is provided. The method includes on request of one or more applications, initiating an outgoing call to a callee, the initiating comprising the steps of generating an API request, identifying the callee and identifying an action of calling said callee; the one or more applications sending the API request to a first server to initiate the outgoing call; the first server, through an API module, deconstructing the API request and instructing a call module to handle the outgoing call; a second server receiving the outgoing call request from the first server; and the second server initiating the outgoing call. The disclosure also provides methods for handling an incoming call within a telecommunications network.

4 Claims, 7 Drawing Sheets

(56) References Cited

U.S. PATENT DOCUMENTS

| | | | |
|---|---|---|---|
| 2016/0182734 A1* | 6/2016 | Bianco | H04M 15/50 |
| | | | 370/356 |
| 2016/0191675 A1* | 6/2016 | De Castro, Jr. | G06F 9/4488 |
| | | | 709/203 |
| 2016/0330319 A1* | 11/2016 | Farrand | H04M 3/42059 |
| 2016/0337513 A1 | 11/2016 | Seward et al. | |
| 2016/0381215 A1 | 12/2016 | Goyal et al. | |
| 2017/0126883 A1* | 5/2017 | Rodriguez | H04M 3/42059 |
| 2017/0331946 A1 | 11/2017 | Mumick et al. | |
| 2020/0099552 A1* | 3/2020 | Ross | H04L 25/03114 |
| 2020/0143822 A1* | 5/2020 | Carriero | H04M 3/42221 |
| 2021/0044943 A1* | 2/2021 | Chu | H04W 4/16 |
| 2022/0060581 A1* | 2/2022 | Willshire | H04M 3/2227 |
| 2022/0321699 A1* | 10/2022 | Willshire | H04M 3/5175 |
| 2023/0156111 A1* | 5/2023 | Pham | G06K 7/1095 |
| | | | 348/14.02 |
| 2024/0007720 A1* | 1/2024 | Saxena | H04N 21/437 |

\* cited by examiner

SYSTEM AND METHOD FOR HANDLING CALLS WITHIN GSM AND VOIP ENVIRONMENTS

TECHNICAL FIELD

The present disclosure generally relates to a system and method within a telecommunication network. In particular, the disclosure relates to a system and method for handling calls, including identifying and notifying subscribers of call attempts within GSM and VoIP telecommunication environments.

BACKGROUND

Voice calls are increasingly conducted within Voice over Internet Protocol (VoIP) environments for example using MS Teams. This is despite the existence of a more reliable and stable GSM network. However, it is acknowledged that there are drawbacks for conducting calls using each of the VoIP and GSM networks. As an example, communications via instant messaging application (IMA) are limited for subscribers of that IMA. Additionally, when for example a user is conducting a call via MS Teams, and there is an incoming call via cellular network (GSM network), the caller does not have any indication that the callee is currently engaged since the MS Teams is handled over VoIP and not GSM. Similarly, a more reliable network including a landline may also be used to call VoIP or to receive incoming calls from VoIP. However, it is facing the same issues as the GSM network above.

In view of the above limitations, therefore there is a need to provide a system and method of using the system that allows synchronization of the VoIP and GSM networks such that the users may seamlessly call from any IMA to a different IMA or even to GSM registered mobile number.

SUMMARY

In accordance with some embodiments of the present disclosure, there is provided a system of one or more computers that can be configured to perform particular operations or actions by virtue of having software, firmware, hardware, or a combination of them installed on the system that in operation causes or cause the system to perform the actions.

One or more computer programs can be configured to perform particular operations or actions by virtue of including instructions that, when executed by data processing apparatus, cause the apparatus to perform the actions.

Within a telecommunications network, the telecommunications network is connected to one or more servers, the one or more servers are in communication with one or more users communication device application (CDA), the one or more CDA comprising an installed one or more computer applications for making calls (Apps), the one or more servers comprising a first server and a second server, the first server and the second server are in communication one with the other, the first server comprising an first API module and a call module, there is provided a method for handling an outgoing call from the one or more CDA. According to some embodiments of the present disclosure, the method comprising on request of the one or more Apps, initiating an outgoing call to a callee, the initiating comprising the steps of generating an API request, identifying the callee and identifying an action of calling said callee, the one or more Apps sending the API request to the first server to initiate the outgoing call, the first server, through the API module, deconstructing the API request and instructing the call module to handle the outgoing call, the second server receiving the outgoing call request from the first server and the second server initiating the outgoing call.

Implementations may include one or more of the following features. Optionally, the first server may be a communication server and the second server may be an outbound calls handler server. Optionally, the communication server may further comprise a recall center API module and the outbound calls handler server may comprise an second API module, and wherein the recall center API module may generate and send an second API request to the second server through the second API module. The outbound calls handler server may further comprise a calls handler module and a virtual number IMA module, the outbound calls handler server, through the second API module, may deconstruct the second API request and instruct the calls handler module to handle the outgoing call. Optionally, the method may further comprise the calls handler server, sending the outgoing call request to the virtual number IMA module, and wherein the virtual number IMA module is in communication with an IMA. According to some embodiments of the present disclosure, the communication server may further comprise a first WebRTC module and wherein the calls handler server may further comprise a second WebRTC module. When the outgoing call is established, a communication between the first WebRTC module and the second WebRTC module may be established via a WebRTC Handler. The outgoing call may be an audio call or a video call.

According to some embodiments of the present disclosure, the second server may be a GSM server. The GSM server may comprise a GSM virtual number module. In some embodiments, the GSM server may further comprise a GSM provider communication server. When the second server is the GSM server, the first server may further comprise a session initiation protocol (SIP) module, in communication with the GSM provider server, wherein before the outgoing call is initiated, the GSM provider server receiving the outgoing call request from the SIP module. According to some embodiments of the present disclosure, the WebRTC Handler may start the outgoing call when a callee CDA one or more Apps is not engaged and wherein the callee CDA one or more Apps is engaged, the first API module notifies the user. The SIP module may start the outgoing call when a callee CDA one or more Apps is not engaged. In some embodiments, when the callee CDA one or more Apps is engaged, the first API module may notify the user. According to some embodiments of the present disclosure, the second server may be a landline server.

In another aspect, within a telecommunications network, the telecommunications network is connected to one or more servers, the one or more servers are in communication with one or more users communication device application (CDA), the one or more CDA comprising an installed one or more computer applications for handling incoming calls (Apps), the one or more servers comprising a first server and a second server, the first server and the second server are in communication one with the other, the first server comprising an first API module, a call module, and a recall center API module, the second server comprising an second API module, a calls handler module, and a virtual number instant messaging application (IMA) module, there is provided a method for handling an incoming call, the incoming call is having an at least one incoming call state, through voice over internet protocol (VoIP).

According to some embodiments of the present disclosure, the method comprising upon receiving the incoming call from a caller through the virtual number IMA module, the virtual number IMA module sending the incoming call request to the call handler module, the call handler module generating an second API request and sending the same to the first server through the second API module to catch the incoming call, the first server through the recall center API module deconstructing the second API request and instructing the call module to handle the incoming call, the call module generating an first API request to the first API module to catch the incoming call and the first server through the first API module deconstructing the first API request and instructing one or more Apps to display the incoming call request.

Implementations may include one or more of the following features. Optionally, the method may further comprise the call module identifying if the one or more user CDA one or more Apps is engaged and if the one or more user CDA one or more Apps is engaged the call handler module terminates the incoming call and notifies the one or more user and the call module changes the incoming call state. According to some embodiments of the present disclosure, when the outgoing call is established within VoIP environment, a communication between the first WebRTC module and the second WebRTC module may be established via a WebRTC Handler. According to some embodiments of the disclosure, the outgoing call may be an audio call or a video call. According to some embodiments of the disclosure, the caller may be a virtual number subscriber (VNS).

In another aspect, within a telecommunications network, the telecommunications network is connected to one or more servers, the one or more servers are in communication with one or more users or callers communication device application (CDA), the one or more CDA comprising an installed one or more computer applications for handling incoming calls (Apps), the one or more users are assigned a virtual number, one or more callers, the one or more servers comprising a first server, and a second server, the first server and the second server are in communication one with the other, the first server comprising an API module, a call module, and a SIP module, there is provided a method for handling an incoming call initiated by one or more callers to the virtual number of the one or more users, the virtual number is registered with the second server, the incoming call is handled through the second server.

According to some embodiments of the disclosure, the method may comprise the caller initiating the incoming call through one or more Apps to the virtual number, the incoming call is received by the second server, upon receiving the incoming call from the caller, the second server, may generate and send a call state callback associated with the incoming call, to the first server, the first server may identify the one or more user associated with the virtual number, the first server may identify if the one or more CDA one or more Apps is engaged and wherein if the one or more CDA one or more Apps is engaged the call module may notify the one or more user and change the call state callback.

Implementations may include one or more of the following features. Optionally, if the one or more CDA one or more Apps is not engaged, the call module may change the call state callback and subsequently the one or more Apps may display an incoming call message on the one or more CDA. According to some embodiments of the disclosure, the incoming call may be established by the SIP module.

BRIEF DESCRIPTION OF THE DRAWINGS

The present disclosure will be understood and better appreciated from the following detailed description taken in conjunction with the drawings. Identical structures, elements or parts, which appear in more than one figure, are generally labelled with the same or similar number in all the figures in which they appear. Some non-limiting embodiments or features of the disclosed subject matter are illustrated in the following drawings.

In the drawings.

Figure 1:
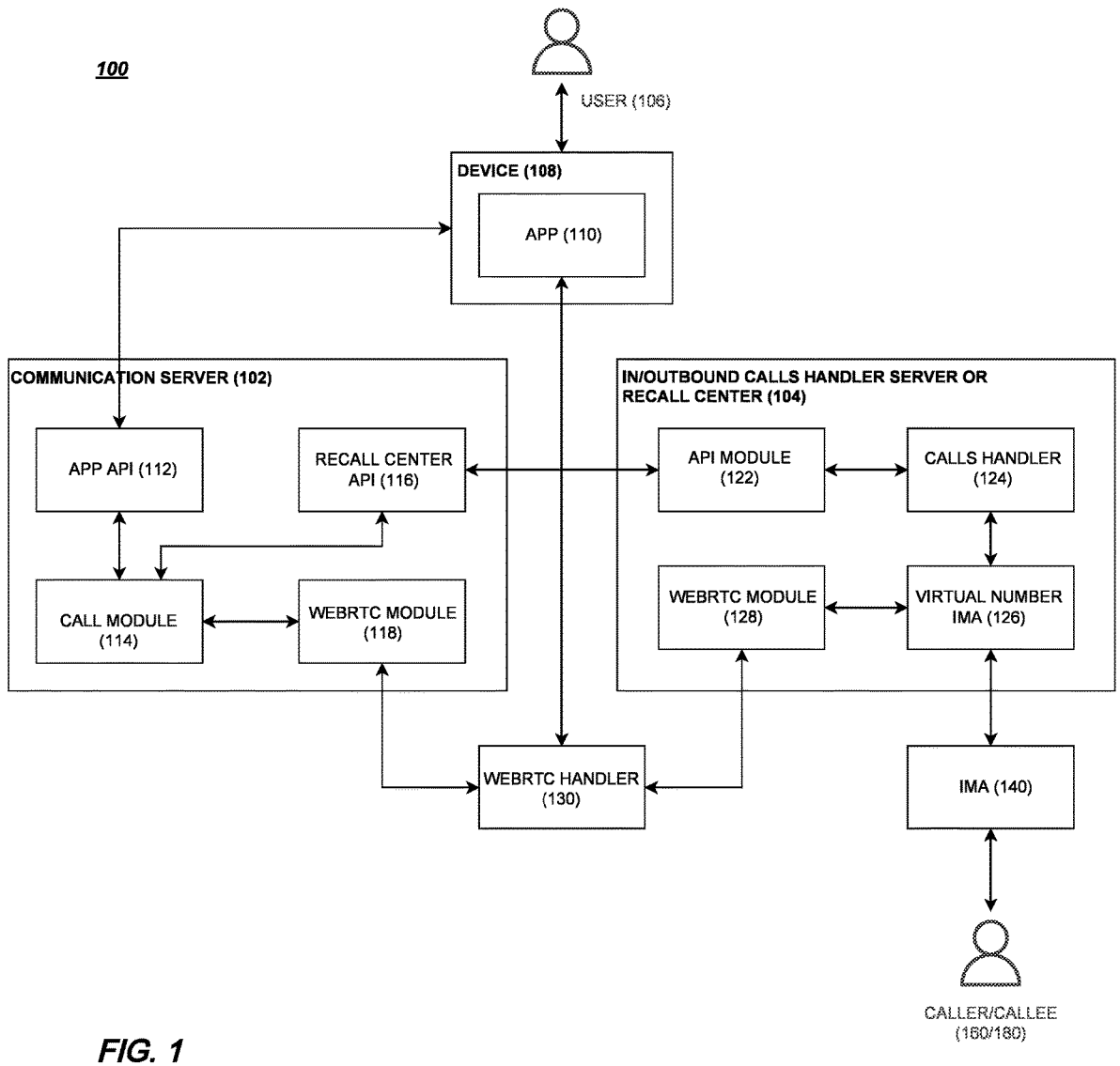
FIG. 1 schematically illustrates a telecommunication system comprising one or more servers in a voice over internet protocol (VoIP) environment, in accordance with some embodiments of the present disclosure.

Identical or duplicate or equivalent or similar structures, elements, or parts that appear in one or more drawings are generally labelled with the same reference numeral, optionally with an additional letter or letters to distinguish between similar entities or variants of entities, and may not be repeatedly labelled and/or described. References to previously presented elements are implied without necessarily further citing the drawing or description in which they appear.

Dimensions of components and features shown in the figures are chosen for convenience or clarity of presentation and are not necessarily shown to scale or true perspective. For convenience or clarity, some elements or structures are not shown or shown only partially and/or with different perspective or from different point of views.

DETAILED DESCRIPTION

Some embodiments of the present disclosure provide a telecommunication method and a system using said method. In some embodiments, there is provided a method and a system for handling an outgoing call. In some embodiments, said outgoing call is audio call or audio and video call.

Although embodiments of the disclosure are not limited in this regard, discussions utilizing terms such as, for example, "processing," "computing," "calculating," "determining," "establishing", "analyzing", "checking", or the like, may refer to operation(s) and/or process(es) of a computer, a communications device, a computing platform, a computer server, computing system, or other electronic computing device, that manipulates and/or transforms data represented as physical (e.g., electronic) quantities within the computer's registers and/or memories into other data similarly represented as physical quantities within the computer's registers and/or memories or other information non-transitory storage medium (e.g., a memory) that may store instructions to perform operations and/or processes. Embodiments in the disclosure are also not limited when utilizing such terms as "communications network", "a telecommunications network", "a network" or other such computerized systems that manipulate and/or send and/or transmit data or information from one device to another and the terms communications network and telecommunications network shall be regarded as interchangeable.

Although embodiments of the disclosure are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Unless explicitly stated, the method embodiments described herein are not constrained to a particular order or sequence. Additionally, some of the described method embodiments or elements thereof can occur or be performed simultaneously, at the same point in time, or concurrently. Unless otherwise indicated, use of the conjunction "or" as used herein is to be understood as inclusive (any or all of the stated options).

The present disclosure provides a telecommunication system (100 or 200) comprising one or more servers in a voice over internet protocol (VoIP) and/or a GSM environment, in accordance with some embodiments of the present disclosure. FIG. 1 schematically illustrates a telecommunication system (100) comprising one or more servers in a voice over internet protocol (VoIP) environment, in accordance with some embodiments of the present disclosure. As can be seen from FIG. 1, the system disclosed in the present disclosure generally includes one or more servers. According to some embodiments, the servers are computerized devices comprising hardware and software. According to some embodiments of the present disclosure, the servers are computer systems, which a user or other computer devices, such as other servers, may interact with. According to some embodiments of the present disclosure, the servers may also include all or some of following components, a display (not shown); non-volatile (non-transitory) memory (NVM) (not shown); random access memory ("RAM") (not shown); one or more processing components embodied in a processor module (not shown); a transceiver component (not shown) that includes one or more transceivers; and user controls (not shown), one or more modules, which are configured to being stored in the NBM or RAM and being processed by the processor module. According to some embodiments, the above components are electronic communication via a bus (not shown). According to some embodiments, the one or more servers may include a landline server. The landline server is designed to manage the landline telephone system.

In some embodiments, as can be seen from FIG. 1, the one or more servers 102, 104 are connected to a telecommunication network (not shown). According to some embodiments, of the present disclosure, the telecommunication network may also include all or some of following components, a telecommunications switching system (not shown), which may be implemented for example on a personal computer platform, personal mobile wireless device, a dedicated system such as a switch, router, or the like. The switching system may be connected to various communications media in accordance with the user's resources. In particular, the switching system may be connected to a high-speed digital link to a local area network (LAN) via LAN interface (not shown), to a wide area network (WAN) via a WAN interface (not shown), to a local loop in a plain old telephone system (POTS) via POTS interface (not shown), and to a wireless communication network via wireless interface (not shown).

In some embodiments, the one or more servers are in communication with one or more user's communication device which comprise a user's communication device application(s) (CDA) (108). The CDAs are typically computer programs installed on the user's communication device, such as for example a mobile wireless device or other mobile communication device. In some embodiments, the one or more CDA may include an installed one or more computer applications for making calls (Apps). In some embodiments, some of the Apps may include such application as WhatsApp, which is a centralized instant messaging and voice-over-IP (VOIP) desktop and mobile application by Meta Platforms; Telegram Messenger, a cloud-based centralized instant messaging and VOIP mobile and desktop application by Telegram Messenger Inc.; Discord, which is an instant messaging and VOIP desktop and mobile application by Discord, Inc. In some embodiments, the one or more servers may include a first server and a second server. In some embodiments, the one or more servers may include a first server, a second server and a third server. In some embodiments, the one or more servers may include a first server, a second server, a third server and a fourth server. The servers may be connected one to the other through one or more of the telecommunication networks.

In some embodiments, each of the two or more servers has substantially the same functionalities. In some embodiments, each of the two or more servers substantially has different functionalities. In some embodiments, each of the one or more servers may comprise a plurality of modules. In some embodiments, modules may refer to software and/or hardware components that function to provide a function of the computerized device. In some embodiments, such modules may be configured to receive, process, manipulate, change, send, transmit, data or information through the use of the processor module. Yet, in other embodiments of the disclosures, modules may be configured to present information to a user on a screen, to transmit or receive data using a switching system, store data in a computerized database, through the use of the processor module. In some embodiments, when there are two or more servers in the system, the servers are in communication one with the other. The term in communication one with the other would mean that the one or more devices or the servers are configured to send and receive data there between using a switching system and protocols such as TCP/IP, VOIP and the like. In an exemplary embodiment, where there are three different servers, server X, server Y and server Z, server X is in communication with server Y, server X is in communication with server Z, and server Y is in communication with server Z.

Figure 8:
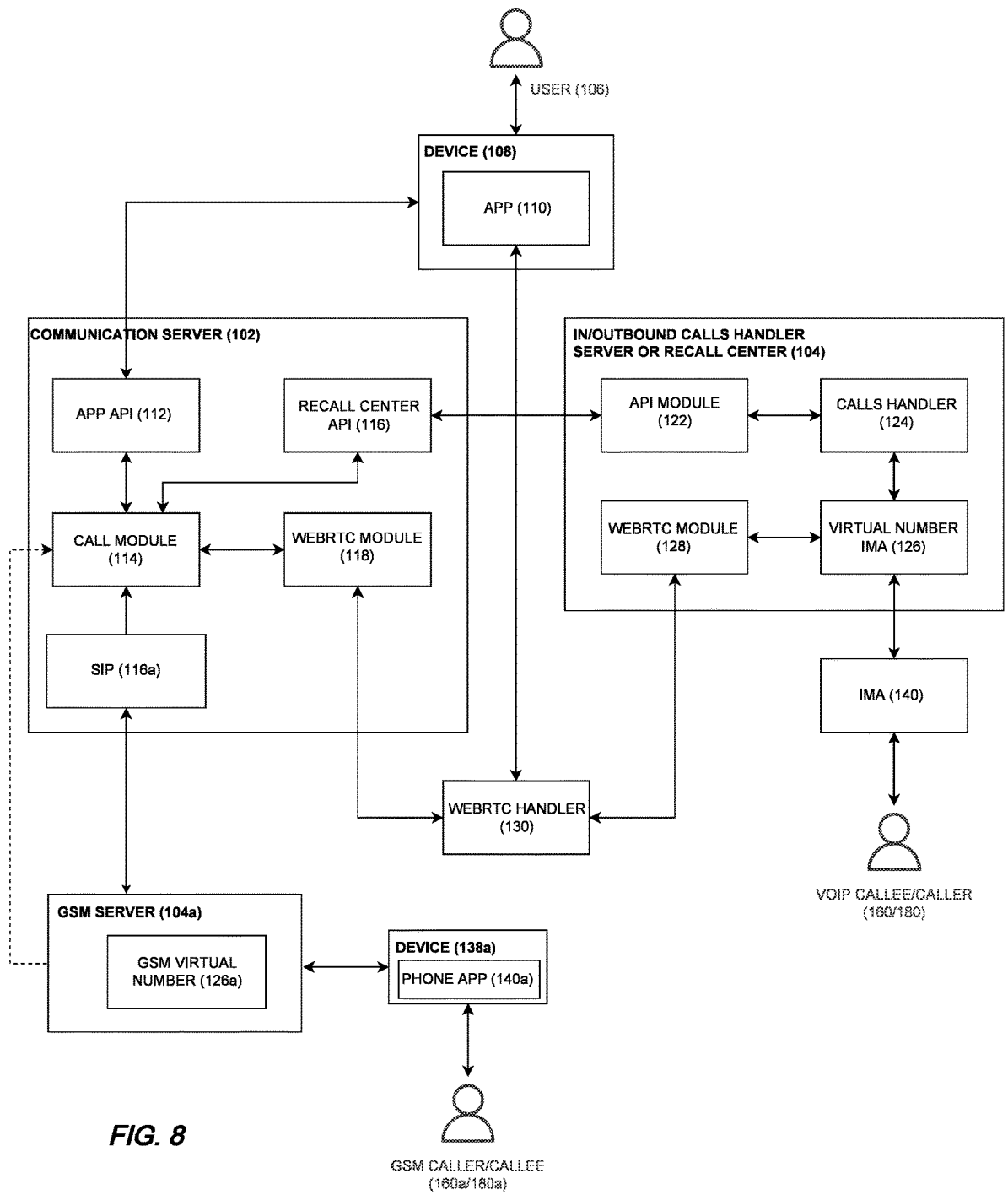
FIG. 8 schematically illustrates a telecommunication system comprising one or more servers within VoIP and GSM environments, in accordance with some embodiments of the present disclosure.

In some embodiments, when the one or more servers include a first server and a second server, as can be seen in FIGS. 1 and 8, the first server is a communication server (102), and the second server is an inbound or outbound calls handler server (104) or a GSM server (104a). In some embodiments, the inbound or outbound calls handler server may be referred to as a recall center server. In some embodiments, for a system handling an outgoing call, the second server is an outbound calls handler server. In some embodiments, for a system handling an incoming call, the second server is an inbound calls handler server.

In some embodiments, the network including telecommunication network described herein may include but is not limited to a mobile network and internet or to any other interconnected network of computers and/or communications network. As understood by a person skilled in the art, such a network may allow users to connect to the Internet. In some embodiments, voice or data transmissions may be performed using mobile devices including smartphones and tablets. In some embodiments, the voice or data transmission may be performed while the person is on the move. In some embodiments, regardless of the networks used, the network may be connected to the first server or communication server and may be scaled up in case of overload.

As can be seen from FIG. 1, the first server is a communication server (102) comprising an first API module (112), a call module (114) and a recall center API module (116). In some embodiments an API is an application programming interface configured to allow two or more computerized devices, such as for example, mobile communication devices and/or servers to share a standard manner of communication one with the other. In some embodiments, the communication server may further comprise a first WebRTC module (118). According to some embodiments, the term WebRTC may refer to a real-time communication service using APIs under real-time guarantees necessary to support real-time communication between users. Such real-time communications can be for example the WebRTC service offered by Google Inc. In some embodiments, the second server is an inbound or outbound calls handler server. In some embodiments, the inbound or outbound calls handler server may be termed as "recall center server". In some embodiments, when an outgoing call is initiated by a user, the second server is the outbound calls handler server. In some embodiments, when a user is receiving an incoming call, the second server is the inbound calls handler server. In some embodiments, the recall center may be a server for handling calls via pixel-catching call handler (not shown). In some embodiments, the pixel-caching call handler, would receive information from the user's communication device and identify the actions of the user using the App so to identify when the user initiates a call. For example, when the user is using an instant messaging App, such as WhatsApp, to initiate a call, the pixel-catching call handler would identify through a user's CDA (108 in FIG. 1) that the user is initiating a call to callee (180). In some embodiments, as described herein, the recall center server may include virtual number instant messaging application (IMA) module (126). In some embodiments, each of the virtual numbers is associated with each user or subscriber. In some embodiments, the recall center server may catch inbound call and may make outbound call. In some embodiments, the recall center server handles the calls via the calls handler module (124). In some embodiments, the call handler module, alone or in communication with other modules, within the same or different server, may provide, inter alia, automatic call routing, queue management, voice prompts and interactive voice response (IVR) capabilities. As will be described below, the call module in the communication server may have main business logic connecting two or more users. In some embodiments, the call module may identify the availability of the user.

In some embodiments, the one or more servers including the first server may comprise a machine learning module (not shown). The machine learning module may use algorithms and statistical models to perform various tasks and make decision. In an exemplary embodiment, if the communication server include one or more machine learning module, the communication server may have the capabilities to at least making decision for example whether the call module should send the API request to the first API module.

In some embodiments, the machine learning module may be a standalone module or integrated to the call module. In some embodiments, the machine learning module may also be integrated to other modules within the server.

In some embodiments, the one or more servers comprises a first server and a second server, the first server and the second server are in communication one with the other, the first server comprising an first API module (112) and a call module (114), there is provided a method for handling an outgoing call from the one or more CDA (108), the method comprises on request of the one or more Apps (110), initiating an outgoing call to a callee (180 or 180a), the initiating comprising the steps of generating an API request, identifying the callee and identifying an action of calling said callee. The method further comprises the one or more Apps sends the API request to the first server to initiate the outgoing call. The method further comprises the first server, through the API module (112), deconstructs the API request and instructs the call module (114) to handle the outgoing call. The method further comprises the second server receives the outgoing call request from the first server and the second server initiates the outgoing call.

In some embodiments, as illustrated in FIG. 1, the second server is an outbound calls handler server (104), the outbound calls handler server (104) may include an second API module (122), a calls handler module (124) and a virtual number IMA module (126). In some embodiments, the recall center API module (116) generates and sends an second API request to the second server through the second API module (122). In some embodiments, the outbound calls handler server (104), through the second API module (122), deconstructs the second API request and instructs the calls handler module (124) to handle the outgoing call. In some embodiments, the calls handler module (124) of the calls handler server (104), sending the outgoing call request to the virtual number IMA module (126), and wherein the virtual number IMA module (126) is in communication with an IMA (140).

In some embodiments, the outbound calls handler server (104) receives the outgoing call request from the first WebRTC module (118). In some embodiments, the calls handler server further comprises a second WebRTC module (128) and wherein the outgoing call request is sent to the virtual number IMA module (126) through the second WebRTC module (128). In some embodiments, when the outgoing call is established, a communication between the first WebRTC module (118) and the second WebRTC module (128) is established via a WebRTC Handler (130). In some embodiments, the outgoing call is an audio call or a video call.

In some embodiments, the system disclosed herein may further comprise a WebRTC handler (130). In some embodiments, the WebRTC Handler (130) may initiate the outgoing call when a callee CDA one or more Apps is not engaged and wherein the callee CDA one or more Apps is engaged, the first API module (112) may notify the user.

In some embodiments, the second server is a GSM server (102a). According to some embodiments, GSM is an embodiment of a digital cellular mobile telephone systems such as GSM, DCS-1800, PCS-1900, TS-95, PDC, D-AMPS and corresponding. Further are related to cellular short distance systems such as DECT, PHS and PACS. Future cellular third generation system such as UMTS, FPLMTS also are related to. In some embodiments, the second server is a landline server. The landline server may be configured to perform one of the followings: call routing, call management, and call recording. In some embodiments, the landline server may receive incoming calls and route the incoming calls to the callee, manage the connections between telephones and optionally may keep track of call information for example for billing purposes.

Figure 2:
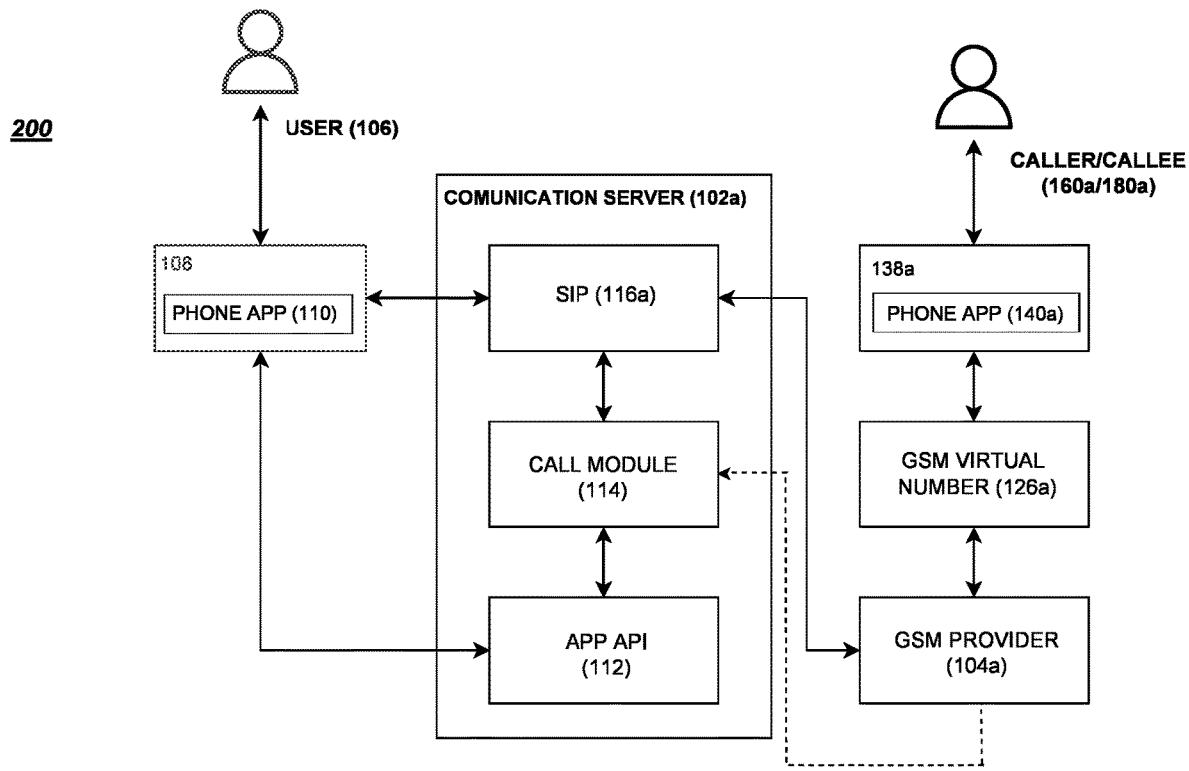
FIG. 2 schematically illustrates a telecommunication system comprising one or more servers in a global system for mobile communications (GSM) network, in accordance with some embodiments of the present disclosure.

In some embodiments, as can be seen at least from FIG. 2, the GSM server may comprise a GSM provider communication server (104a) and a GSM virtual number module (126a). In some embodiments, when the second server is the GSM server (104a), the first server further may comprise a session initiation protocol (SIP) module (116a), in communication with the GSM provider server (104a), wherein before the outgoing call is initiated, the GSM provider server (104a) may receive the outgoing call request from the SIP module (116a).

In some embodiments, the SIP module may start the outgoing call when a callee CDA one or more Apps is not engaged and wherein the callee CDA one or more Apps is engaged, the first API module may notify the user.

Figure 3:
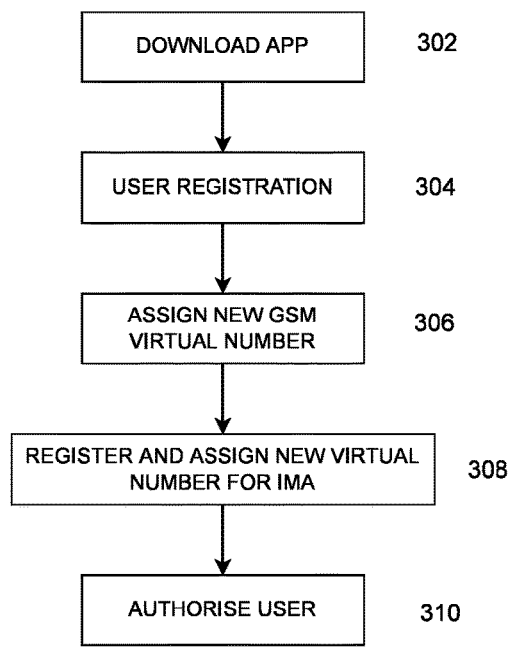
FIG. 3 is a flowchart illustrates a method for registration of a virtual number, in accordance with some embodiments of the present disclosure.

FIG. 3 is a flowchart illustrating a method of obtaining a virtual number to be used by a user in conjunction with the method or system described in the present disclosure. The method illustrated in FIG. 3 describes how a user (106 in FIG. 1) may obtain a virtual number through a process described in this figure. The process of FIG. 3 commences in step 302, where the user may download the App from a provider including for example, Apple store, Google Play Store, Android App Store or Play Store. In some embodiments, in step 304, once the App is downloaded, the user is prompted to register a new account, which may include a virtual number. In some embodiments, the registration step may include providing a mobile phone number. In some embodiments, in step 306, following the completion of the registration, a new virtual number may be assigned. In some embodiments, the new virtual number may be a new GSM virtual number. In some embodiments, in step 308, the new virtual number is associated with the IMA used. In some embodiments, the association is stored in server 102 for use in conjunction with the other methods of the present disclosure. In some embodiments, in step 310, an authorization may be granted to the user by the server 102.

Figure 4:
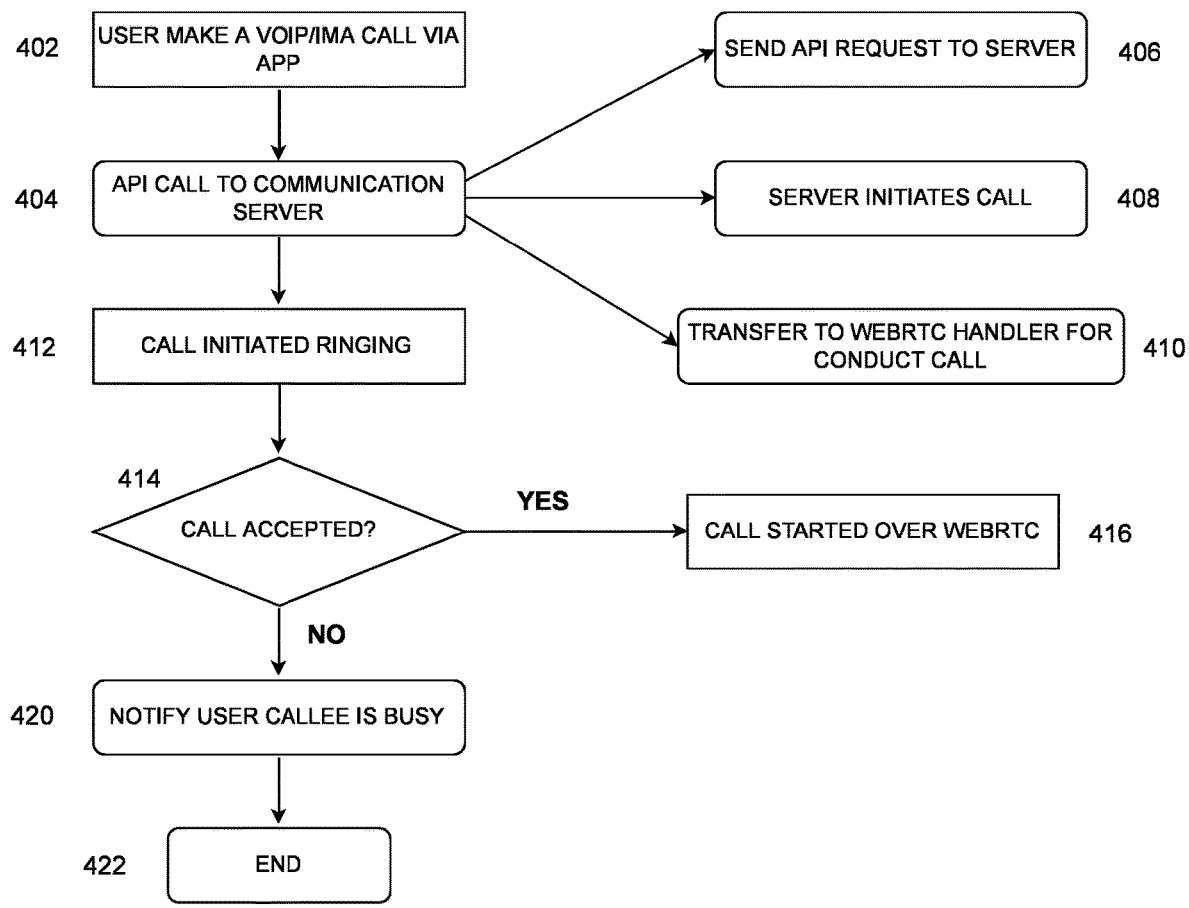
FIG. 4 is a flowchart illustrates a method for handling an outgoing call within VoIP environment, in accordance with some embodiments of the present disclosure.

FIG. 4 is a flowchart illustrating a method for handling an outgoing call from the one or more CDA (108) to a callee (180) within a telecommunications network and system (100) described in FIG. 1. In some embodiments, the outgoing call is within VoIP environment. In some embodiments, the method comprises operation 402 whereby on request of the one or more Apps, initiating an outgoing call to a callee, the initiating comprising the steps of generating a first API request, identifying the callee and identifying an action of calling said callee. In some embodiments, operation 404 comprises the one or more Apps sending the first API request to the first server to initiate the outgoing call. In some embodiments, the first server, through the first API module, deconstructs the first API request and instructs the call module to handle the outgoing call. In some embodiments, operation 406 comprises the recall center API module, generates and sends a second API request to the second server. In some embodiments, operation 408 comprises the second server, through the second API module, deconstructs the second API request and instructs the calls handler module to handle the outgoing call. In some embodiments, the calls handler server, sends the outgoing call request to the virtual number IMA module, the virtual number IMA module is in communication with an IMA and the second server initiates the outgoing call. In some embodiments, the second server receives the outgoing call request from the first WebRTC module. In some embodiments, the second server further comprises a second WebRTC module and wherein the outgoing call request is sent to the virtual number IMA module through the second WebRTC module. In some embodiments, operation 414 comprises the communication server identifying if the outgoing call is accepted by the callee. In some embodiments, when the outgoing call is established, operation 410 comprises establishing a communication between the first WebRTC module and the second WebRTC module via a WebRTC Handler. In some embodiments, operation 416 comprises call being started over WebRTC Handler. In some embodiments, the outgoing call is an audio call or a video call. In some embodiments, operation 416 comprises the WebRTC Handler starts the outgoing call when a callee CDA one or more Apps is not engaged and wherein the callee CDA one or more Apps is engaged, operation 420 comprises the first API module notifies the user. In some embodiments, the notification sent to the user may be a notification that the callee is busy.

Figure 5:
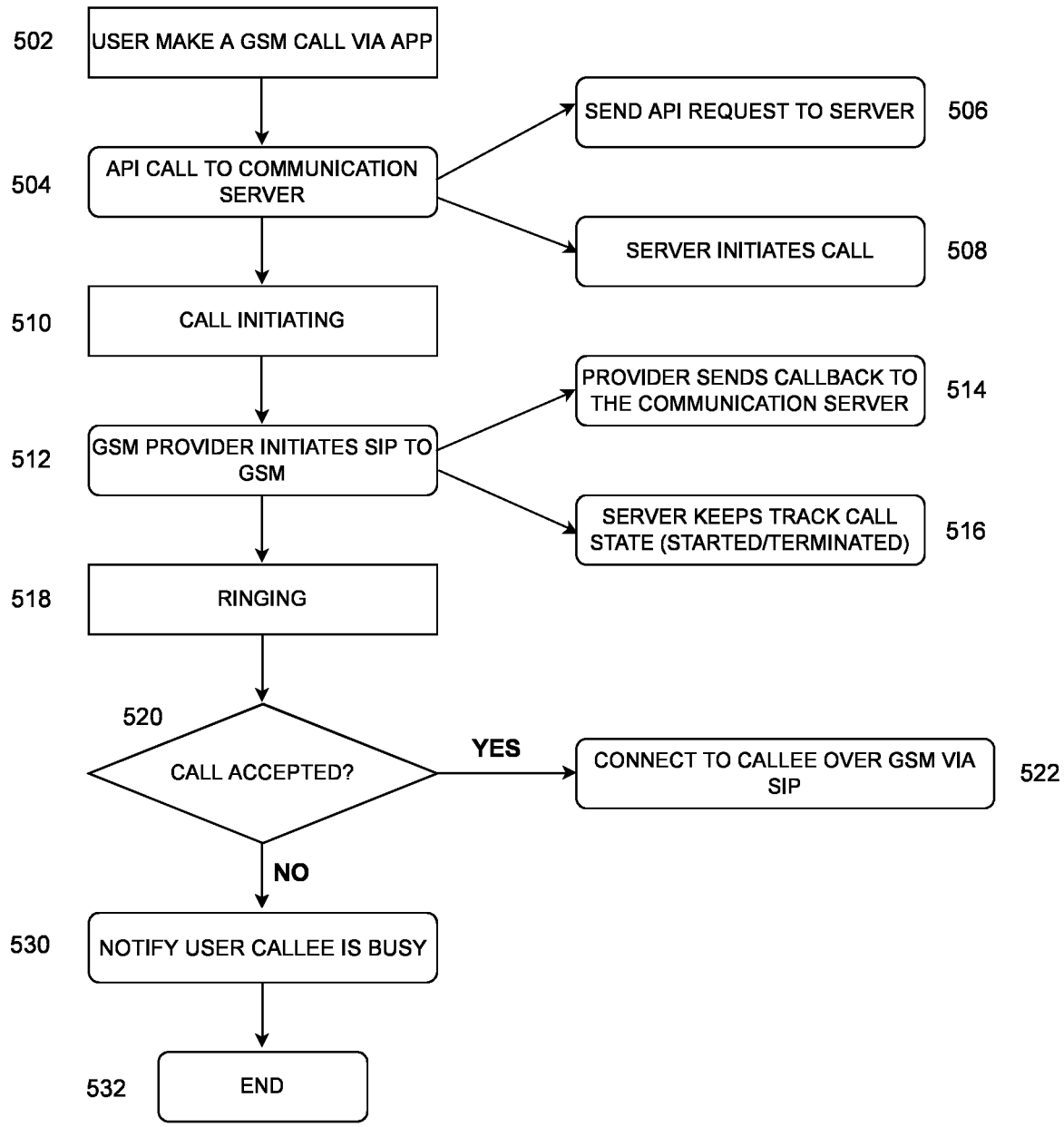
FIG. 5 is a flowchart illustrates a method for handling an outgoing call within GSM environment, in accordance with some embodiments of the present disclosure.

FIG. 5 is a flowchart illustrating the method for handling an outgoing call from the one or more CDA to a callee (180a) within a telecommunications network and system (200) described in FIGS. 2 and 8 within GSM environment. In some embodiments, the operations described in FIG. 4 (operations 402, 404, 406 and 408) may be applicable to this method (operations 502, 504, 506, 508 and 510), except that the second server is a GSM server and that the first server further comprises a SIP module. As illustrated in FIG. 8, the first server further comprises a session initiation protocol (SIP) module, in communication with the GSM provider server. In some embodiments, before the outgoing call is initiated, operation 512 comprises the GSM provider server receiving the outgoing call request from the SIP module. In some embodiments, when GSM provider initiates SIP to GSM, operation 514 comprises the GSM provider sending callback to the communication server. In some embodiments, when GSM provider initiates SIP to GSM, operation 516 comprises the communication server keeping track of the call state. In some embodiments, the call state is "started" or "terminated". In some embodiments, operation 518 comprises establishing the connection to the callee (180a). In some embodiments, operation 520 comprises identifying if the call is accepted by the callee. In some embodiments, after the connection or "ringing" is established, operation 522 comprises the SIP module starts the outgoing call when a callee CDA one or more Apps is not engaged and wherein the callee CDA one or more Apps is engaged, operation 530 comprises the first API module notifies the user. In some embodiments, the instant messaging application (IMA) includes but is not limited to such applications such as WhatsApp, Telegram others.

In some embodiments, the communication module may allow communication between browsers and mobile applications. In some embodiments, the communication module may allow communication between browsers and mobile applications without the need for plugins or additional software. In some embodiments, the communication module is WebRTC. In some embodiments, WebRTC allows for voice calling, video calling, voice and video conferencing and file sharing.

Figure 6:
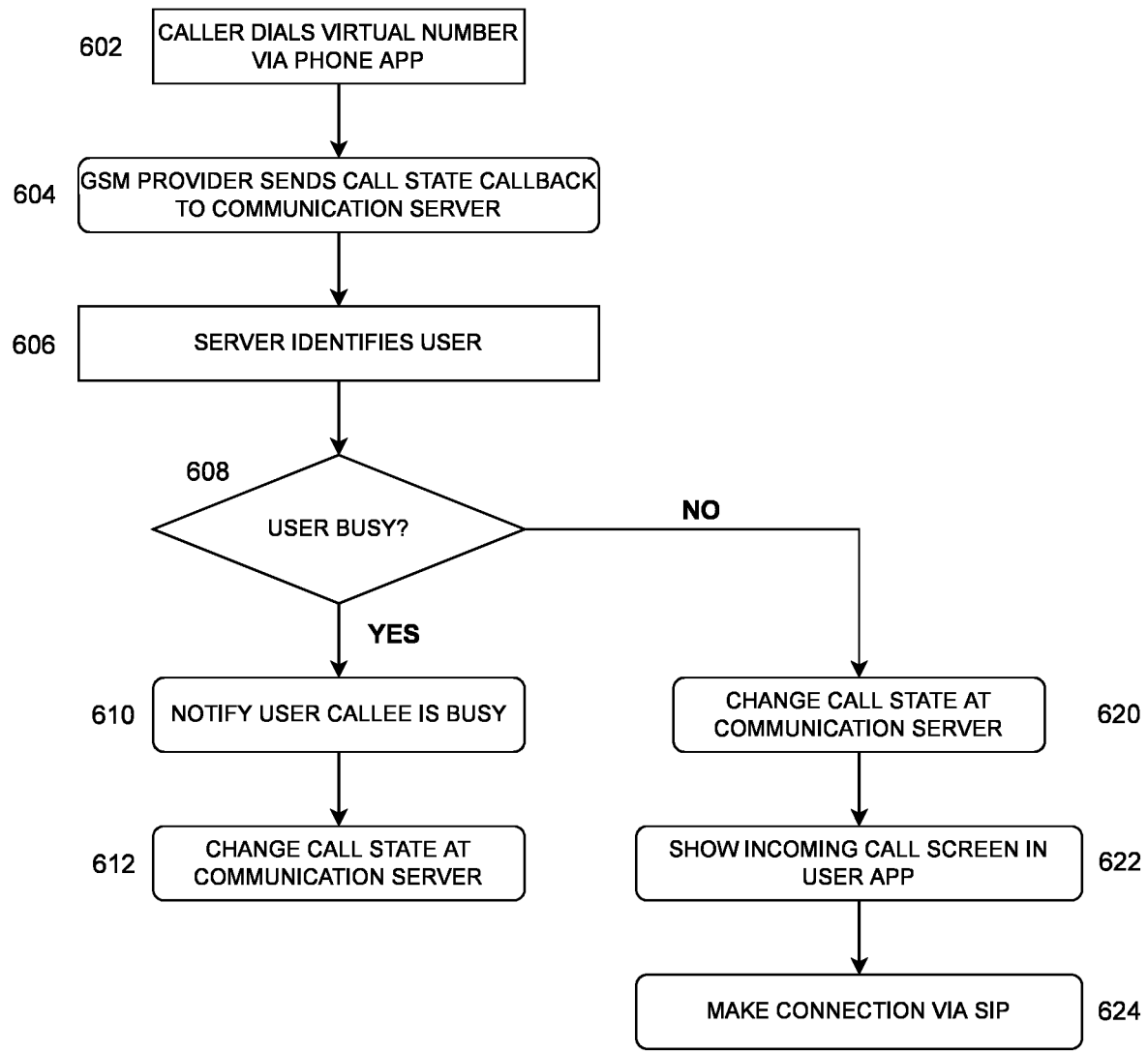
FIG. 6 is a flowchart illustrates a method for handling an incoming call within GSM environment, in accordance with some embodiments of the present disclosure.

FIG. 6 is a flowchart illustrating a method for handling an incoming call from a caller (160a) within GSM environment, in accordance with some embodiments of the present disclosure. As can be seen from this figure, operation 602 comprises a caller dialing a user via user's virtual number. In some embodiments, the caller may likewise call the user via his virtual number. Subsequently, operation 604 comprises the GSM server (second server) sending a call state callback to the communication server (first server). In some embodiments, operation 606 comprises the communication server, receiving the incoming call request, subsequently identifying the user is available or busy (operation 608). In some embodiments, when the user is not busy (or not engaged), operation 620 comprises the communication server changing incoming call state and operation 622 comprises displaying incoming call notification on the screen of the CDA. When the connection is established, operation 624 comprises establishing the incoming call connection via SIP module.

Still, referring to FIG. 6, when the user is engaged, operation 610 comprises notifying the caller that the user is currently busy. In some embodiments, the user may be notified on the unsuccessful attempts of incoming call. In some embodiments, operation 612 comprises the communication server changing the call state.

In some embodiments, within a telecommunications network, the telecommunications network is connected to one or more servers, the one or more servers are in communication with one or more users or callers communication device application (CDA), the one or more CDA comprising an installed one or more computer applications for handling incoming calls (Apps), the one or more users are assigned a virtual number, one or more callers, the one or more servers comprising a first server, and a second server, the first server and the second server are in communication one with the other, the first server comprising an API module, a call module, and a SIP module, there is provided a method for handling an incoming call initiated by one or more callers to the virtual number of the one or more users, the virtual number is registered with the second server, the incoming call is handled through the second server. In some embodiments, the method may begin with the caller initiating the incoming call through one or more Apps to the virtual number, and subsequently the incoming call is received by the second server. In some embodiments, upon receiving the incoming call from the caller, the second server, generates and sends a call state callback associated with the incoming call, to the first server. In some embodiments, the first server may identify the one or more user associated with the virtual number. In some embodiments, the method may include the first server identifying if the one or more CDA one or more Apps is engaged. In some embodiments, the method may include if the one or more CDA one or more Apps is engaged, the call module notifies the one or more user and changes the call state callback. In some embodiments, the second server is a GSM server.

In some embodiments, when the one or more CDA one or more Apps is not engaged, the call module may change the call state callback and the one or more Apps may display an incoming call message on the one or more CDA. In some embodiments, the incoming call is established by the SIP module.

Figure 7:
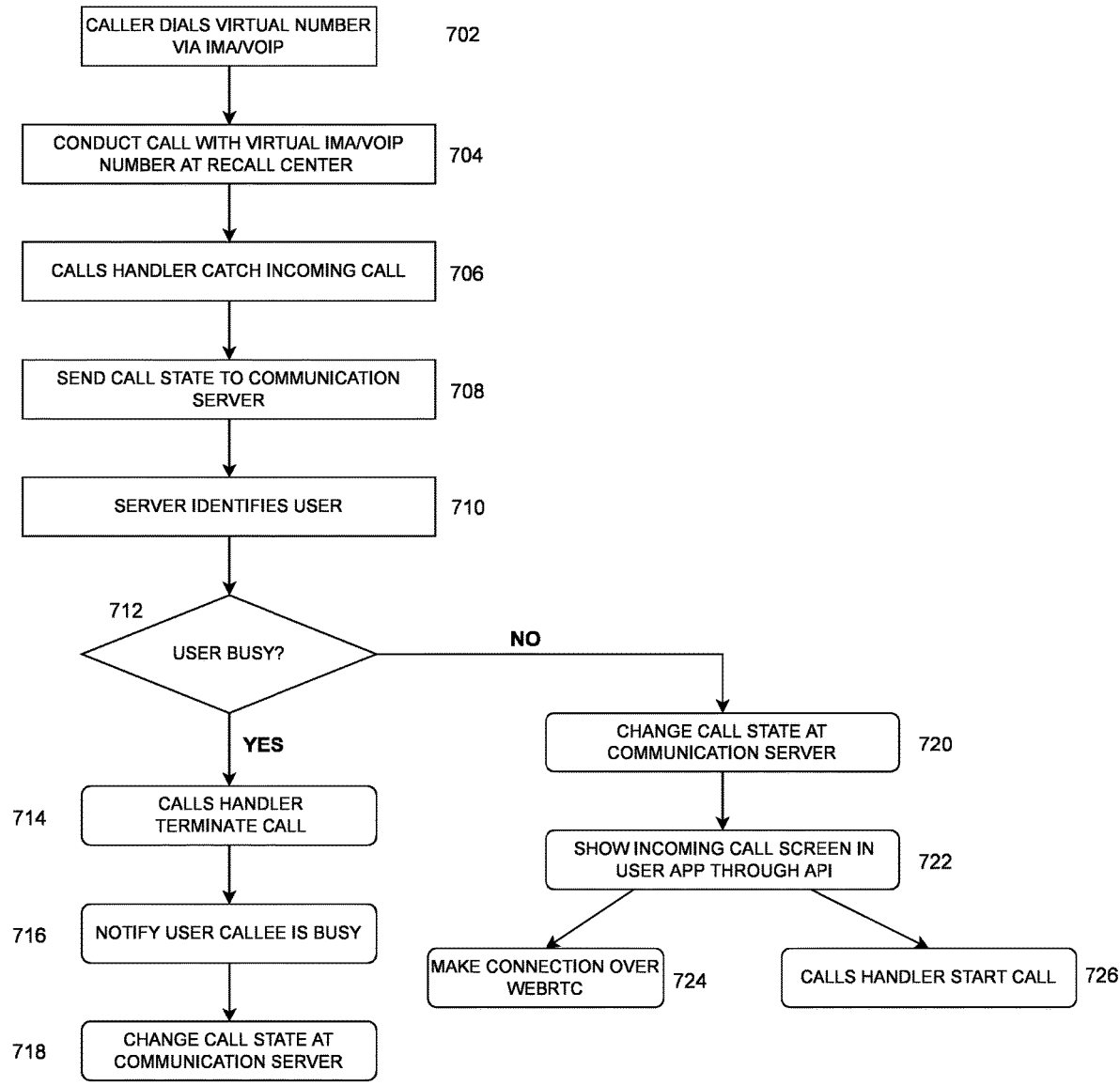
FIG. 7 is a flowchart illustrates a method for handling an incoming call within VoIP environment, in accordance with some embodiments of the present disclosure.

FIG. 7 is a flowchart illustrating a method for handling an incoming call from a caller (160) within VoIP environment, in accordance with some embodiments of the present disclosure. As can be seen from this figure, operation 702 comprises a caller dialing the user via registered virtual number associated with IMA or VoIP. In some embodiments, the caller may likewise use his registered virtual number associated with IMA or VoIP. In such embodiment, the caller may be considered being a virtual number subscriber (VNS). In some embodiments, the incoming call request may be received by the second server. In some embodiments, the second server is inbound calls handler server (or recall center). In some embodiments, operation 704 comprises directing the incoming call request to the calls handler module of the recall center, operation 706 comprises the calls handler module configured to catch the incoming call from the virtual number IMA module. In some embodiments, operation 708 comprises sending the request to the first server (communication server). In some embodiments, sending the request comprising sending call state to the communication server. In some embodiments, sending the request comprising the calls handler module sending API request to the API module. In some embodiments, as can be seen from FIG. 8, the API module is in communication with the recall center API module of the communication module. In some embodiments, the second server, which may be the outbound calls handler server or recall center server, may send call state to the first server (communication server). Upon receiving the incoming call request, in some embodiments, operation 710 comprises the communication server identifying if the user is engaged (busy) or not engaged (available). In some embodiments, if the user is busy, operation 714 comprises the calls handler module of the second server terminating the incoming call. In some embodiments, operation 716 comprises sending a notification to the caller that the user is engaged or not available. In some embodiments, a second notification may be sent to the callee or user on unsuccessful call attempts. In some embodiments, the caller may be a virtual number subscriber (VNS). In some embodiments, optionally, after the caller is notified that the user or callee is busy, operation 718 comprises changing the call state at the communication server. In some embodiments, the call module may change the incoming call state.

In some embodiments, when the callee is not engaged, operation 720 comprises changing the incoming call state at the communication server. In some embodiments, the call module may change the incoming call state. Subsequently, in some embodiments, the call module may generate an first API request to the first API module to catch the incoming call. In some embodiments, operation 722 comprises the first server through the first API module deconstructing the first API request and instructing one or more Apps to display the incoming call request. In some embodiments, when the incoming call is established, operation 724 comprises establishing a communication between the first WebRTC module and the second WebRTC module via a WebRTC Handler. In some embodiments, operation 726 comprises the calls handler module starting the incoming call. In some embodiments, the incoming call may be an audio call or a video call. In some embodiments, the caller is a virtual number subscriber (VNS).

In some embodiments, within a telecommunications network, the telecommunications network is connected to one or more servers, the one or more servers are in communication with one or more users communication device application (CDA), the one or more CDA comprising an installed one or more computer applications for handling incoming calls (Apps), the one or more servers comprising a first server and a second server, the first server and the second server are in communication one with the other, the first server comprising an first API module, a call module, and a recall center API module, the second server comprising an second API module, a calls handler module, and a virtual number instant messaging application (IMA) module, there is provided a method for handling an incoming call, the incoming call is having an at least one incoming call state, through voice over internet protocol (VoIP). In some embodiments, said method may include upon receiving the incoming call from a caller through the virtual number IMA module, the virtual number IMA module sends the incoming call request to the call handler module. Subsequently, in some embodiments, the call handler module may generate an second API request and send the same to the first server through the second API module to catch the incoming call. In some embodiments, the first server through the recall center API module may deconstruct the second API request and instruct the call module to handle the incoming call. In some embodiments, the call module may generate an first API request to the first API module to catch the incoming call. In some embodiments, the first server through the first API module may deconstruct the first API request and instruct one or more Apps to display the incoming call request.

In some embodiments, the method may further comprise the call module identifying if the one or more user CDA one or more Apps is engaged. In some embodiments, when the one or more user CDA one or more Apps is engaged, the call handler module may terminate the incoming call and notify the one or more user and the call module may change the incoming call state.

In some embodiments, when the outgoing call is established, a communication between the first WebRTC module and the second WebRTC module may be established via a WebRTC Handler. In some embodiments, the outgoing call may be an audio call or a video call. In some embodiments, the caller is a virtual number subscriber (VNS).

In some embodiments, as previously described and mentioned, similar to GSM network, the landline network through its server may be configured to call VoIP and may receive a notification that the callee is engaged. Therefore, advantageously, the method and system disclosed herein may include the landline server and thus landline users or subscribers may call the virtual number described in the present application. Similarly, the users via their virtual numbers may call the landline users.

It is to be understood that not necessarily all objects or advantages may be achieved in accordance with any particular embodiment of the present application. The person skilled in the art will recognize that the invention may be embodied or carried out in a manner that achieves or optimizes one advantage or group of advantages as taught herein without necessarily achieving other objects or advantages as may be taught or suggested herein.

Moreover, the person skilled in the art will recognize the interchangeability of various features from different embodiments. In other words, the features of the devices disclosed in the various embodiments can be switched between embodiments. Other combinations of the various aspects of the disclosed embodiments are also possible. In addition to the variations described herein, other known equivalents for each feature can be mixed and matched by a person skilled in the art to construct systems and techniques to ensure that a constant pressure or force is transmitted to the outer surface of the eyelid of the subject in accordance with principles of the present invention.

Furthermore, although the foregoing has been described in some detail by way of illustrations and examples for purposes of clarity and understanding, it is apparent to the person skilled in the art that certain changes and modifications may be practiced. Therefore, the description and examples should not be construed as limiting the scope of the invention to the specific embodiments and examples described herein. Rather the scope of the present disclosure is defined only by the claims, which follow.

What is claimed is:

1. A method for handling an incoming call within a telecommunications network,
   wherein the telecommunications network is connected to one or more servers;
   the one or more servers are in communication with one or more user communication device applications (CDAs);
   the one or more CDAs comprising an installed one or more computer applications for handling incoming calls (Apps);
   the one or more servers comprising a first server and a second server;
   the first server and the second server are in communication one with the other;
   the first server comprising a first application programming interface (API) module, a call module, and a recall center API module;
   the second server comprising a second API module, a calls handler module, and a virtual number instant messaging application (IMA) module;
   the incoming call is having an at least one incoming call state, through voice over internet protocol (VoIP),
   said method comprising:
   upon receiving the incoming call from a caller through the virtual number IMA module, the virtual number IMA module sending the incoming call request to the call handler module;
   the call handler module generating a second API request and sending the second API request to the first server through the second API module to catch the incoming call;
   the first server through the recall center API module deconstructing the second API request and instructing the call module to handle the incoming call;
   the call module generating a first API request to the first API module to catch the incoming call;
   the first server through the first API module deconstructing the first API request and instructing one or more Apps to display the incoming call request;
   the call module identifying if the one or more user CDA Apps is engaged;
   wherein when the one or more user CDA Apps is engaged the call handler module terminates the incoming call and notifies the one or more user; and
   the call module changes the incoming call state, and further notifies a caller which initiated the incoming call that the user is unavailable.

2. The method of claim 1, wherein when an outgoing call is established, a communication between the first WebRTC module and the second WebRTC module is established via a WebRTC Handler.

3. The method of claim 2, wherein the outgoing call is an audio call or a video call.

4. The method of claim 1, wherein the caller is a virtual number subscriber (VNS).

* * * * *